US011935488B2

(12) United States Patent
Pyun et al.

(10) Patent No.: US 11,935,488 B2
(45) Date of Patent: Mar. 19, 2024

(54) DISPLAY DEVICE

(71) Applicant: SAMSUNG DISPLAY CO., LTD., Yongin-si (KR)

(72) Inventors: Ki Hyun Pyun, Yongin-si (KR); Hee Sook Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/453,256

(22) Filed: Nov. 2, 2021

(65) Prior Publication Data

US 2022/0319439 A1 Oct. 6, 2022

(30) Foreign Application Priority Data

Apr. 2, 2021 (KR) ........................ 10-2021-0043566

(51) Int. Cl.
*G09G 3/3275* (2016.01)
*G09G 3/3233* (2016.01)

(52) U.S. Cl.
CPC ......... *G09G 3/3275* (2013.01); *G09G 3/3233* (2013.01); *G09G 2310/027* (2013.01)

(58) Field of Classification Search
CPC ............... G09G 3/3233; G09G 3/3275; G09G 2320/043; G09G 2320/0233; G09G 2320/0295; G09G 2320/0626; G09G 3/3406
See application file for complete search history.

(56) References Cited

U.S. PATENT DOCUMENTS 8,280,458 B2 10/2012 Joo
2017/0069238 A1* 3/2017 Moon .................... G09G 3/006
2018/0166020 A1* 6/2018 Hwang ................ G09G 3/3233
2020/0175919 A1* 6/2020 Hong ................... G09G 3/3291
2020/0380911 A1* 12/2020 Park ......................... G09G 3/32
2021/0012704 A1* 1/2021 Pyun .................... G09G 3/3225

FOREIGN PATENT DOCUMENTS

KR 10-0514184 9/2005
KR 10-1168937 8/2012

* cited by examiner

*Primary Examiner* — Nelson M Rosario
*Assistant Examiner* — Scott D Au
(74) *Attorney, Agent, or Firm* — F. Chau & Associates, LLC

(57) ABSTRACT

A display device includes a display panel, a power supply a current measurer, a controller, and a sensor. The display panel includes pixels connected between first and second power lines. The power supply applies power voltages to the first and second power lines. The current measurer measures a current applied to the display panel from the power supply through the first and second power lines. The controller outputs a first sensing control signal indicating whether to sense a voltage-current characteristic of the light emitting element of at least one of the pixels based on a measured current. The sensor senses the voltage-current characteristic of the light emitting element in response to the first sensing control signal.

19 Claims, 12 Drawing Sheets

DISPLAY DEVICE

CROSS-REFERENCE TO RELATED APPLICATION

The application claims priority to and the benefit of Korean Patent Application No. 10-2021-0043566, filed Apr. 2, 2021, which is hereby incorporated by reference in its entirety.

BACKGROUND

1. Field of the Invention

One or more embodiments described herein relate to a display device.

2. Background of the Related Art

A display device includes a data driver for driving pixels of a display panel. Each pixel may include a driving transistor and a light emitting element. The driving transistor controls the amount of current flowing in the pixel based on the data signal, and the light emitting element emits light with a luminance that corresponds to the amount of current. The performance of the light emitting element (for example, an organic light emitting diode) may deteriorate or degrade over time. Additionally, or alternatively, the threshold voltage of the driving transistor may change or shift. As a result, the pixel may emit light with a luminance different from a desired luminance.

SUMMARY

One or more embodiments described herein provide a display device capable of reducing the number of sensing times and/or the sensing time for sensing a degree of deterioration of a light emitting element and a threshold voltage of a driving transistor of a pixel.

In accordance with one or more embodiments, a display device includes a display panel including pixels connected between a first power line and a second power line, each of the pixels including a light emitting element configured to emit light in response to a driving current flowing between the first and second power lines; a power supply configured to apply power voltages to the first and second power lines of the display panel; a current measurer configured to measure a current applied to the display panel from the power supply through the first and second power lines; a sensing controller configured to output a first sensing control signal indicating whether to sense a voltage-current characteristic of the light emitting element of at least one of the pixels based on a measured current; and a sensor configured to sense the voltage-current characteristic of the light emitting element of the at least one pixel in response to the first sensing control signal.

In accordance with one or more embodiments, a display device includes a display panel including a pixel connected between a first power line and a second power line, the pixel including a light emitting element connected between the first and second power lines and a driving transistor configured to control a driving current flowing through the light emitting element; a power supply configured to apply power voltages to the first and second power lines of the display panel; a current measurer configured to measure a current applied to the display panel from the power supply through the first and second power lines; a sensing controller configured to output a first sensing control signal indicating whether to sense a threshold voltage of the driving transistor based on a measured current; and a sensor configured to sense the threshold voltage of the driving transistor in response to the first sensing control signal.

In accordance with one or more embodiments, a display device includes a display panel including a pixel connected between a first power line and a second power line, the pixel including a light emitting element connected between the first and second power lines and a driving transistor configured to control a driving current flowing through the light emitting element in response to a data signal; a data driver configured to generate the data signal based on image data, provide the data signal to the pixel, and sense a characteristic of the light emitting element; an age calculator configured to calculate an age of the pixel based on the image data; and a sensing controller configured to adjust a cycle of sensing the characteristic of the light emitting element by the data driver based on the age.

BRIEF DESCRIPTION OF THE DRAWINGS

The accompanying drawings, which are included to provide a further understanding of the inventive concepts, and are incorporated in and constitute a part of this specification, illustrate example embodiments of the inventive concepts, and, together with the description, serve to explain principles of the inventive concepts.

DETAILED DESCRIPTION

Figure 1:
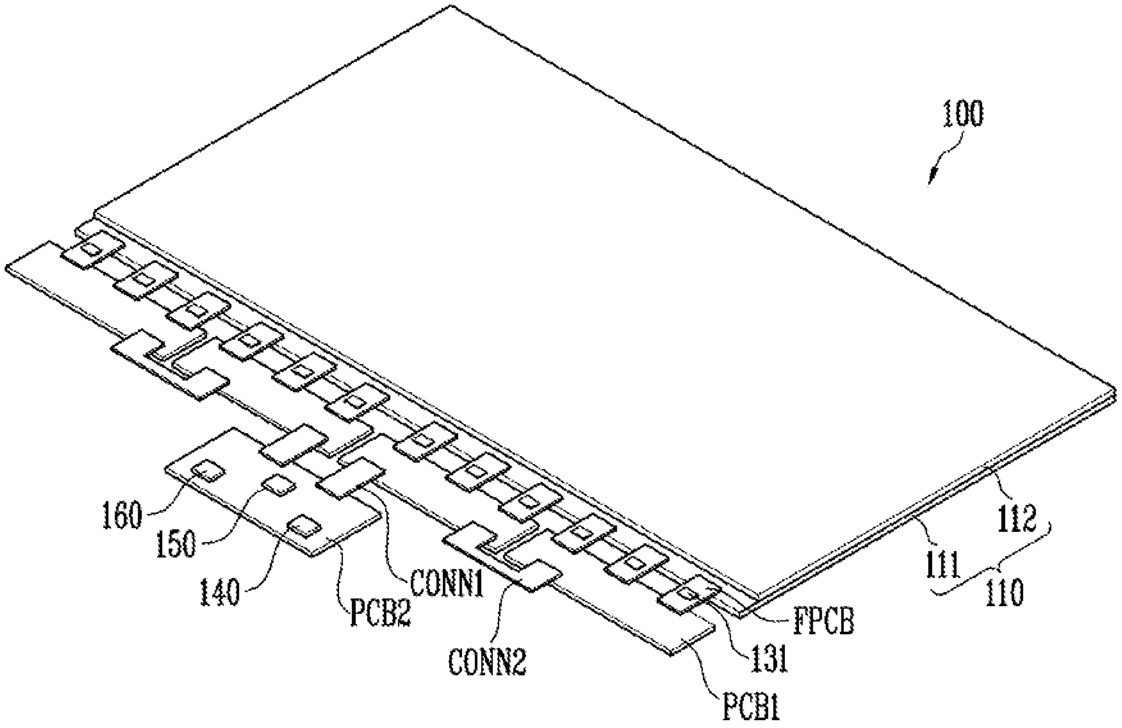
FIG. 1 illustrates an embodiment of a display device.

The disclosure may be modified in various ways and may have various forms, and specific embodiments will be illustrated in the drawings and described in detail in the written description. In the following description, the singular forms also include the plural forms unless the context clearly includes only the singular.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Meanwhile, the disclosure is not limited to the embodiments disclosed below, and may be changed and implemented in various forms. In addition, each of the embodiments disclosed below may be implemented alone or in combination with at least one of other embodiments. In the drawings, some elements which are not directly related to the features of the disclosure may be omitted to clearly represent the disclosure. In addition, some elements in the drawings may be shown to be exaggerated in size or proportion. Throughout the drawings, the like elements will be given by like reference numerals and symbols as much as possible even though they are shown in different drawings, and duplicate descriptions will be omitted.

Figure 2:
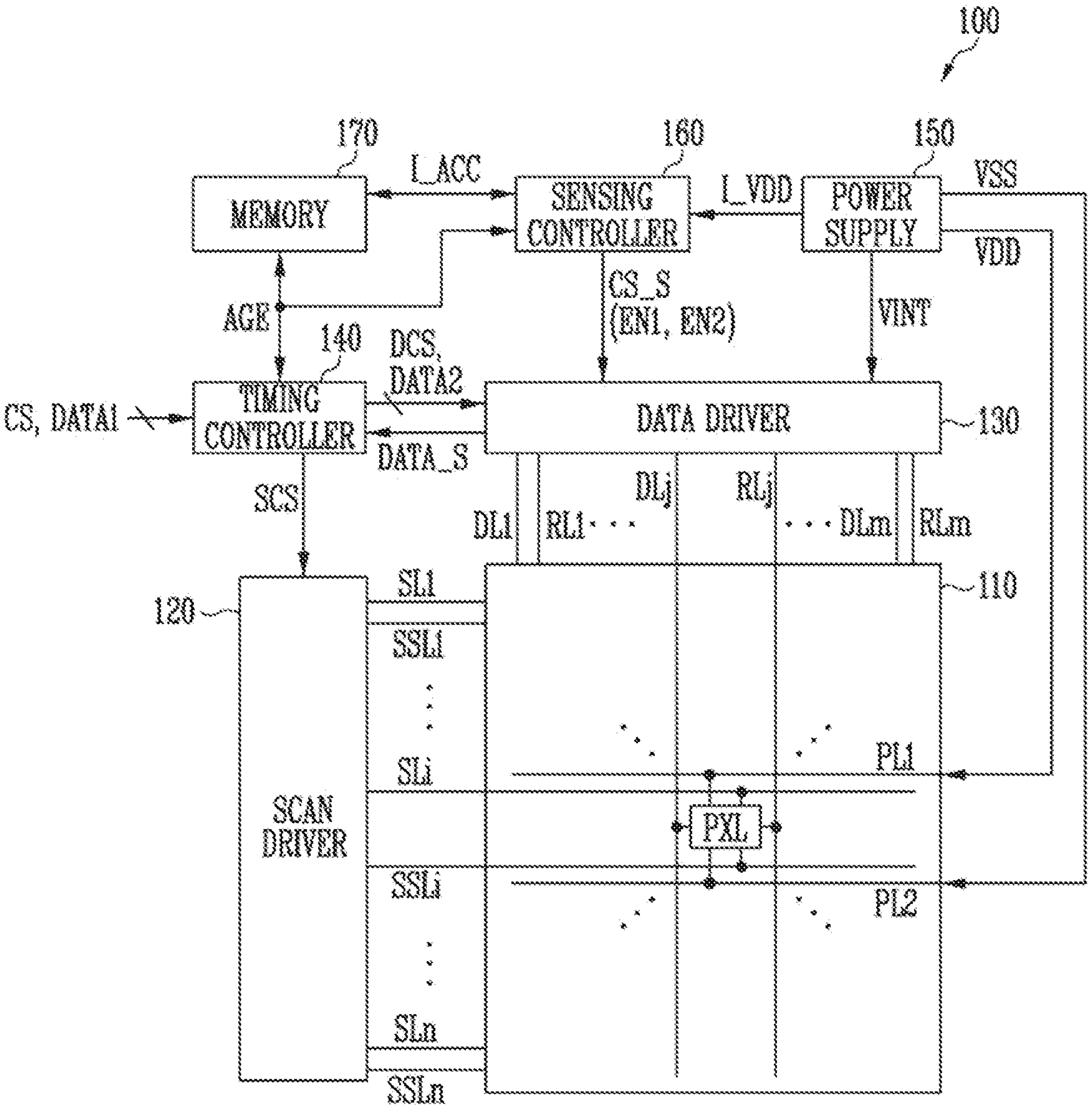
FIG. 2 illustrates an embodiment of a display device.

FIGS. 1 and 2 are diagrams illustrating a display device according to embodiments of the present invention. FIG. 1 is a perspective view of a display device 100, and FIG. 2 is a block diagram of the display device 100.

Referring to FIGS. 1 and 2, the display device 100 may include a display unit 110 (or display panel), a scan driver 120 (or gate driver), a data driver 130 (or source driver or sensing unit), a timing controller 140, a power supply 150, a sensing controller 160, and a memory 170 (or storage unit). The scan driver 120, the data driver 130, the timing controller 140, the power supply 150, the sensing controller 160, and the memory 170 may constitute a driving device that drives the display unit 110.

The display unit 110 may display an image and, for example, may be an organic light emitting display panel, a liquid crystal display panel, an electrophoretic display panel, or an inorganic light emitting display panel. As shown in FIG. 1, the display unit 110 may include a lower substrate 111 and an upper substrate 112. The lower substrate 111 may be a thin film transistor substrate made of plastic or glass. The upper substrate 112 may be an encapsulation substrate made of a plastic film, a glass substrate, or a protective film.

In addition, the display unit 110 may include scan lines SL1 to SLn, sensing scan lines SSL1 to SSLn, data lines DL1 to DLm, readout lines RL1 to RLm (or sensing lines), a first power line PL1, a second power line PL2, and a pixel PXL, where n and m may be positive integers. The pixel PXL may be disposed or positioned in an area (for example, a pixel area) partitioned by the scan lines SL1 to SLn and the data lines DL1 to DLm.

The pixel PXL may be connected to one of the scan lines SL1 to SLn and one of the data lines DL1 to DLm. Also, the pixel PXL may be connected to one of the sensing scan lines SSL1 to SSLn and one of the readout lines RL1 to RLm. For example, the pixel PXL positioned in an i-th row and a j-th column may be connected to an i-th scan line SLi, an i-th sensing scan line SSLi, a j-th data line DLj, and a j-th readout line RLj, where i and j may be positive integers.

Also, the pixel PXL may be electrically connected between the first power line PL1 and the second power line PL2. A first power voltage VDD may be applied to the first power line PL1, and a second power voltage VSS may be applied to the second power line PL2. The first and second power voltages VDD and VSS may be power voltages or driving voltages to operate the pixel PXL. The first power voltage VDD may have a voltage level higher than that of the second power voltage VSS. The first and second power voltages VDD and VSS may be provided from the power supply 150 to the display unit 110.

The pixel PXL may be initialized using a third power voltage VINT, provided through the j-th readout line RLj in response to a sensing scan signal provided through the i-th sensing scan line SSLi. The pixel PXL may store or write a data signal (or data voltage) provided through the j-th data line DLj in response to a scan signal provided through the i-th scan line SLi, and may emit light with a luminance corresponding to the stored data signal. In one embodiment, the third power voltage VINT may have a voltage level lower than an operating point (or a threshold voltage) of a light emitting element within the pixel PXL. An embodiment of the pixel PXL is described with reference to FIG. 3.

The scan driver 120 may generate the scan signal (or scan signals) based on a scan control signal SCS and may sequentially provide the scan signal to the scan lines SL1 to SLn. The scan control signal SCS may include one or more signals (e.g., a start signal, clock signals, and the like) and may be provided from the timing controller 140 to the scan driver 120. For example, the scan driver 120 may be implemented as a shift register that sequentially generates and outputs the scan signal of a pulse type by sequentially shifting the start signal of a pulse type using the clock signals. Also, similar to the method of generating the scan signal, the scan driver 120 may generate the sensing scan signal and sequentially provide the sensing scan signal to the sensing scan lines SSL1 to SSLn.

The scan driver 120 may be formed together with the pixel PXL on the display unit 110. However, the present invention is not limited thereto. For example, the scan driver 120 may be mounted on a circuit film and connected to the timing controller 140 via at least one circuit film and a printed circuit board. In FIG. 1, the scan driver 120 is shown to be positioned on one side of the display unit 110, but the scan driver 120 is not limited thereto. For example, the scan driver 120 may be positioned on both sides (for example, left and right) of the display unit 110 or distributed and disposed within the display unit 110.

The data driver 130 may generate data signals (or data voltages) based on image data DATA2 and a data control signal DCS from the timing controller 140 and may provide the data signals to the display unit 110 (or pixel PXL) through the data lines DL1 to DLm. The data control signal DCS may be a signal that controls operation of the data driver 130, and in one embodiment may include a load signal (or data enable signal) indicating an output of a valid data signal, a horizontal start signal, a data clock signal, and the like. For example, the data driver 130 may include a shift register that generates a sampling signal by shifting the horizontal start signal in synchronization with the data clock signal, a latch for latching the image data DATA2 in response to the sampling signal, a digital-to-analog converter (or decoder) that converts the latched image data (for example, digital data) into analog data signals, and buffers (or amplifiers) that output the data signals to the data lines DL1 to DLm. In addition, the data driver 130 may provide the third power voltage VINT from the power supply 150 to the display unit 110 (or pixel PXL) through the readout lines RL1 to RLm.

In an embodiment, the data driver 130 may receive a sensing signal (for example, current) from the pixel PXL through the readout lines RL1 to RLm in response to a sensing control signal CS_S. The sensing signal may be, or may correspond to, characteristic information on the pixel PXL. Examples include threshold voltage and/or mobility of a driving transistor in the pixel PXL, a voltage-current characteristic of the light emitting element in the pixel PXL (or degree of deterioration indicative of a characteristic of the light emitting element), etc. The sensing control signal CS_S may be provided from the sensing controller 160 to the data driver 130 in a sensing section (e.g., a section allocated to sense the characteristic of the pixel PXL). For example, since it takes a certain time (for example, about 5 minutes when the display unit 110 includes 3840×2160 pixels) to sense the characteristics of all or a portion of pixels in the display unit 110, the sensing section may be allocated immediately before the display device 100 is powered off (for example, a time point at which a power control signal instructing the power-off of the display device 100 is provided from an external device). However, the sensing section is not limited thereto.

In addition, the data driver 130 may generate sensing data DATA_S based on the sensing signal, and the sensing data DATA_S may be provided to the timing controller 140. The sensing data DATA_S may be used by the data driver 130 and/or the timing controller 140 to compensate for the characteristic (e.g., characteristic deviation or deterioration) of the pixel PXL. For example, the data driver 130 may include circuit elements (for example, an amplifier, a capacitor, a transistor, and the like) for amplifying and sampling the sensing signal (or current). In addition, the data driver 130 may include an analog-to-digital converter for converting an analog sensing signal into a digital sensing value (or sensing data DATA_S including a sensing value).

As shown in FIG. 1, the data driver 130 may include a plurality of data driver integrated circuits (IC) 131 (or source driver ICs). The data driver IC 131 may be mounted on a flexible circuit board FPCB and may be connected to the timing controller 140 via at least one printed circuit board PCB1 and PCB2 and/or at least one cable CONN1 and CONN2.

The timing controller 140 may receive input image data DATA1 and a control signal CS from the external device (for example, a graphic processor), generate the scan control signal SCS and the data control signal DCS based on the control signal CS, and convert the input image data DATA1 to generate the image data DATA2. In one embodiment, the control signal CS may include a vertical synchronization signal (or Vsync), a horizontal synchronization signal (or Hsync), a reference clock signal, and/or other signals. The vertical synchronization signal may indicate the start of frame data (e.g., data corresponding to a frame section in which one frame image is displayed). The horizontal synchronization signal may indicate the start of a data row (e.g., one of a plurality of data rows included in the frame data). In one embodiment, the timing controller 140 may convert input image data DATA1 in one format (e.g., RGB format) to image data DATA2 in another format (e.g., RGBG format) corresponding to a pixel arrangement in the display unit 110.

In an embodiment, the timing controller 140 may compensate for the image data DATA2 based on the sensing data DATA_S. For example, a first compensation grayscale value (or first grayscale compensation value) or a first compensation ratio may be calculated based on a characteristic of the pixel PXL and a grayscale value. The characteristics of the pixel PXL may be indicated, for example, in the sensing data DATA_S (e.g., characteristic of the light emitting element and/or the threshold voltage (or the change amount of the threshold voltage) of the driving transistor). The grayscale value may be compensated based on the first compensation grayscale value or the first compensation ratio.

In an embodiment, the timing controller 140 may calculate an age AGE of the pixel PXL (or the light emitting element in the pixel PXL) based on the image data DATA2 (or input image data DATA1), and may compensate for the image data DATA2 based on the age AGE of the PXL. For example, as the driving amount (for example, driving time, grayscale value) of the pixel PXL increases or accumulates, the light emitting element (for example, the organic light emitting diode) of the pixel PXL may become deteriorated or degraded. The deteriorated light emitting element may, in turn, emit light with a different luminance than the light emitting element would have properly emitted before the deterioration too place for the same or substantially the same data signal.

Accordingly, in one embodiment the timing controller 140 may periodically scale and accumulate the grayscale value corresponding to the pixel PXL within the image data DATA2 to generate or update the accumulated grayscale value (accumulated data, stress data, or deterioration data). Also, the age AGE of the pixel PXL may be calculated based on an age curve in which a relationship between accumulated data and age is predefined relative to the accumulated grayscale value. For example, the timing controller 140 may calculate a second compensation grayscale value (or second grayscale compensation value) or a second compensation ratio based on the age AGE of the pixel PXL, and may compensate for the grayscale value corresponding to the pixel PXL based on the second compensation grayscale value or the second compensation ratio. Information on the age AGE of the pixel PXL (for example, age data, accumulated data) may be stored, for example, in the memory 170.

The power supply 150 may supply the first power voltage VDD and the second power voltage VSS to the display unit 110. The power supply 150 may provide the third power voltage VINT to the data driver 130. In addition, the power supply 150 may provide at least one power voltage for driving to at least one of the scan driver 120, the data driver 130, or the timing controller 140. The power supply 150 may be implemented as a power management IC (PMIC).

The sensing controller 160 may generate the sensing control signal CS_S based on a total current I_VDD applied or flowing to the display unit 110 according to the first power voltage VDD and the second power voltage VSS supplied from the power supply 150. For example, the total current I_VDD may be measured through a current sensor at an output terminal of the power supply 150 from which the first power voltage VDD is output. The sensing control signal CS_S may indicate whether to sense the characteristic of the light emitting element in the pixel PXL and whether to sense the threshold voltage of the driving transistor in the pixel PXL. According to an embodiment, the sensing control signal CS_S may include a first enable signal EN1 instructing to sense the characteristic of the light emitting element and a second enable signal EN2 instructing to sense the threshold voltage of the driving transistor.

In embodiments, the sensing controller 160 may periodically accumulate a value of the total current I_VDD to generate an accumulated current value I_ACC, and may generate the sensing control signal CS_S when the accumulated current value is greater than or equal to a reference current value.

In an embodiment, the sensing controller 160 may periodically accumulate the value of the total current I_VDD to generate a first accumulated current value, and may generate the first enable signal EN1 (e.g., the first enable signal EN1 instructing to sense the characteristic of the light emitting element) when the first accumulated current value is greater than or equal to a first reference current value. With generation of the first enable signal EN1, the first accumulated current value may be initialized (for example, may be initialized to a value of 0). The sensing controller 160 may also periodically accumulate the value of the total current I_VDD to generate a second accumulated current value, and may generate the second enable signal EN2 (that is, the second enable signal EN2 instructing to sense the threshold voltage of the driving transistor) when the second accumulated current value is greater than or equal to a second reference current value. The second reference current value may be set differently from the first reference current value. With the generation of the second enable signal EN2, the second accumulated current value may be initialized.

For reference, when the display unit 110 displays only a black pattern image (that is, an image in which the all or a portion of the display unit 110 is black or substantially black and has luminance corresponding thereto) for a specific time, the light emitting element and the driving transistor in the pixel PXL may not be significantly deteriorated. In this case, the characteristic of the light emitting element and the threshold voltage of the driving transistor in the pixel PXL may not be sensed. In addition, even when a white pattern image is displayed only in a partial area of the display unit 110, pixels PXL in remaining areas of the display unit 110 may not be sensed. Accordingly, the sensing controller 160 may determine whether sensing of the pixel PXL is to be performed based on the degree of deterioration of the pixel PXL (that is, the light emitting element and the driving transistor) indicated by the total current I_VDD applied to the display unit 110. Since unnecessary sensing of the pixel PXL is prevented, the number of sensing times of the pixel PXL can be reduced.

In addition, the sensing controller 160 may individually determine whether to sense the characteristic of the light emitting element and whether to sense the threshold voltage of the driving transistor. Accordingly, sensing of the characteristic of the light emitting element and the sensing of the threshold voltage of the driving transistor may be performed independently of each other. For example, only the characteristic of the light emitting element may be sensed when the display device 100 is powered off at a previous time point, and only the threshold voltage of the driving transistor may be sensed when the display device 100 is powered off at the current time point. Therefore, overall sensing time can be reduced. In addition, since sensing of the characteristic of the light emitting element and/or the sensing of the threshold voltage of the driving transistor are independently performed at one or more time points, sensing can be performed more accurately compared with the case of sensing both the characteristic of the light emitting element and the threshold voltage of the driving transistor.

In an embodiment, the sensing controller 160 may change at least one of the first or second reference current values based on the age AGE (e.g., age data, stress data, or deterioration data) of the pixel PXL. Information on the age AGE of the pixel PXL may be provided from the timing controller 140. For example, as the age AGE of the pixel PXL increases (e.g., as the pixel PXL deteriorates), the sensing controller 160 may decrease the first reference current value. As the first reference current value decreases, the sensing controller 160 may determine to sense the characteristic of the light emitting element based on a relatively small accumulated current value. For example, as the light emitting element of the pixel PXL deteriorates, a sensing cycle can be reduced and distortion of image quality due to the deterioration of the light emitting element of the pixel PXL can be prevented in advance.

At least part of the sensing controller 160 may be implemented as an integrated circuit (for example, an integrated circuit including a transistor, a capacitor, a resistor, a multiplexer, etc., an FPGA) or may be implemented in software in the integrated circuit. Embodiments of the configuration and operation of the sensing controller 160 are described with reference to FIG. 4.

The memory 170 may store the age AGE (age data, stress data, or deterioration data) of the pixel PXL. Also, the memory 170 may store other information including, but not limited to, the accumulated current value I_ACC (or the first and second accumulated current values). The memory 170 may be implemented, for example, as a non-volatile memory device such as a flash memory.

As described above, the display device 100 may determine whether sensing of the pixel PXL (e.g., sensing the characteristic of the light emitting element and/or sensing of the threshold voltage of the driving transistor) is to be performed in consideration of the degree of deterioration of the pixel PXL (e.g., the light emitting element and the driving transistor) based on the total current I_VDD (or the accumulated current value I_ACC) applied to the display unit 110. Accordingly, unnecessary sensing of the pixel PXL can be prevented and the number of sensing times can be reduced.

In addition, the display device 100 may individually determine whether to sense the characteristic of the light emitting element and whether to sense the threshold voltage of the driving transistor, and may independently perform sensing of the characteristic of the light emitting element and sensing of the threshold voltage of the driving transistor at each designated or predetermined time point. Accordingly, sensing time can be reduced and sensing can be performed more accurately at each of a plurality of time points at which sensing of the light emitting element and/or the driving transistor is to be performed.

Furthermore, the display device 100 may change the reference current value (e.g., a reference for determining whether or not to sense) based on the age AGE (e.g., age data, stress data, or deterioration data) of the pixel PXL. Accordingly, as the pixel PXL deteriorates, the sensing cycle can be shortened and distortion of image quality due to deterioration of the pixel PXL can be reduced or prevented in advance.

At least one of the scan driver 120, the data driver 130, the timing controller 140, the power supply 150, or the sensing controller 160 may be formed on the display unit 110 or may be implemented as an integrated circuit and connected to the display unit 110, for example, in the form of a tape carrier package. In addition, at least two of the scan driver 120, the data driver 130, the timing controller 140, the power supply 150, or the sensing controller 160 may be implemented as one integrated circuit. For example, at least a part of the sensing controller 160 may be in the timing controller 140.

In one embodiment, the data driver 130 and the timing controller 140 may be implemented as a single integrated circuit.

Figure 3:
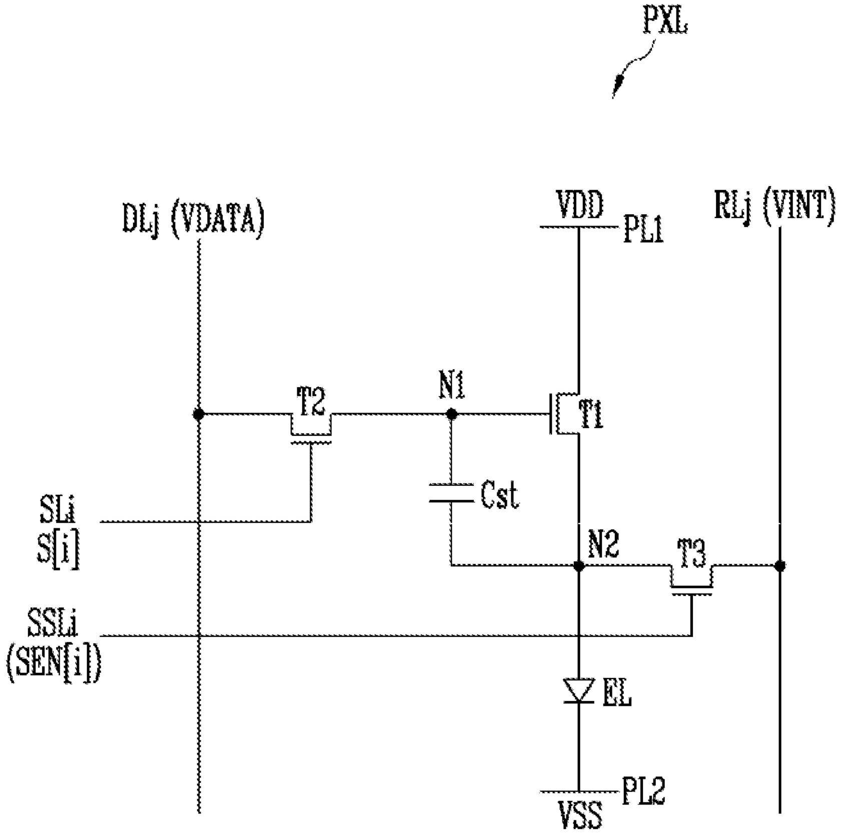
FIG. 3 illustrates an embodiment of a pixel.

FIG. 3 is a diagram illustrating an embodiment of pixel PXL in the display device of FIG. 2. The pixel PXL positioned in the i-th row and the j-th column is shown as an example.

Referring to FIG. 3, the pixel PXL may be connected to the i-th scan line SLi, the j-th data line DLj, the i-th sensing scan line SSLi, and the j-th readout line RLj. The pixel PXL may include a light emitting element EL, a first transistor T1 (or driving transistor), a second transistor T2 (or first switching transistor), a third transistor T3 (sensing transistor or second switching transistor), and a storage capacitor Cst. Each of the first transistor T1, the second transistor T2, and the third transistor T3 may be a thin film transistor including an oxide semiconductor, but may be a different type of transistor in another embodiment. For example, one or more of the first transistor T1, the second transistor T2, or the third transistor T3 may include a polysilicon semiconductor material or may be implemented as an N-type semiconductor or a P-type semiconductor.

A first electrode (or anode electrode) of the light emitting element EL may be connected to a second node N2 (or a second electrode of the first transistor T1). The first electrode of the light emitting element EL may be connected to the first power line PL1 via the first transistor T1. The first power voltage VDD may be applied to the first power line PL1. A second electrode (or cathode electrode) of the light emitting element EL may be connected to the second power line PL2. The second power voltage VSS may be applied to the second power line PL2. The light emitting element EL may generate light of a predetermined luminance in response to the amount of current (or driving current) supplied from the first transistor T1. For example, the light emitting element EL may include an organic light emitting diode but may be a different type of light emitting element in another embodiment. For example, the light emitting element EL may include an inorganic light emitting diode such as a micro LED (light emitting diode) or a quantum dot light emitting diode, or may be a light emitting diode including a combination of organic and inorganic materials.

A first electrode (for example, a drain electrode) of the first transistor T1 may be connected to the first power line PL1, and the second electrode (for example, a source electrode) may be connected to the second node N2 (or the anode electrode of the light emitting element EL). A gate electrode of the first transistor T1 may be connected to a first node N1 (or a second electrode of the second transistor T2). The first transistor T1 may control the amount of current flowing to the light emitting element EL in response to a voltage of the first node N1 (or a gate-source voltage applied between the gate electrode and the second electrode of the first transistor T1).

A first electrode of the second transistor T2 may be connected to the j-th data line DLj, and the second electrode may be connected to the first node N1 (or the gate electrode of the first transistor T1). A gate electrode of the second transistor T2 may be connected to the i-th scan line SLi. When an i-th scan signal S[i] is supplied to the i-th scan line SLi, the second transistor T2 may be turned on and a data signal VDATA (or data voltage) from the j-th data line DLj may be transferred to the first node N1.

The storage capacitor Cst may be formed or connected between the first node N1 and the first electrode of the light emitting element EL. The storage capacitor Cst may store the voltage of the first node N1.

The third transistor T3 may be connected between the j-th readout line RLj and the second node N2 (or the second electrode of the first transistor T1). The third transistor T3 may connect the second node N2 and the j-th readout line RLj in response to a sensing scan signal SEN[i]. In this case, the third power voltage VINT applied to the j-th readout line RLj may be applied to the second node N2. A voltage of the second node N2 or one electrode of the light emitting element EL may be initialized by the third power voltage VINT.

When the second transistor T2 and the third transistor T3 are simultaneously turned on in response to the i-th scan signal S[i] and the sensing scan signal SEN[i], a voltage difference between the data signal VDATA and the third power voltage VINT may be stored in the storage capacitor Cst, and the first transistor T1 may control the amount of current flowing through the light emitting element EL in response to the voltage difference stored in the storage capacitor Cst.

In an embodiment, when the third transistor T3 connects the second node N2 and the j-th readout line RLj in response to the sensing scan signal SEN[i] during the sensing section, the sensing signal may be provided to the j-th readout line RLj from the pixel PXL. For example, when the first transistor T1 is turned off and the third transistor T3 is turned on, a sensing voltage (or a node voltage of the second node N2) may be provided to the j-th readout line RLj. In one embodiment, when the first transistor T1 is turned off and the third transistor T3 is turned on, the data driver 130 (e.g., refer to FIG. 2) may apply a reference voltage through the j-th readout line RLj. In this case, a current may flow through the j-th readout line RLj, the third transistor T3, and the light emitting element EL, and the data driver 130 may sense the current. The sensing voltage or sensing current may correspond to the characteristic of the light emitting element EL.

In one embodiment, when the first transistor T1 is turned on by a test voltage (that is, a test voltage applied as the data signal VDATA) and the third transistor T3 is turned on, a current flowing through the first transistor T1 in response to the test voltage may be provided to the j-th readout line RLj, and the data driver 130 may sense the current. The sensing current may correspond to a threshold voltage (or a change in threshold voltage and mobility) of the first transistor T1. The pixel PXL may have a different circuit structure other than the one shown in FIG. 2 in other embodiments.

Figure 4:
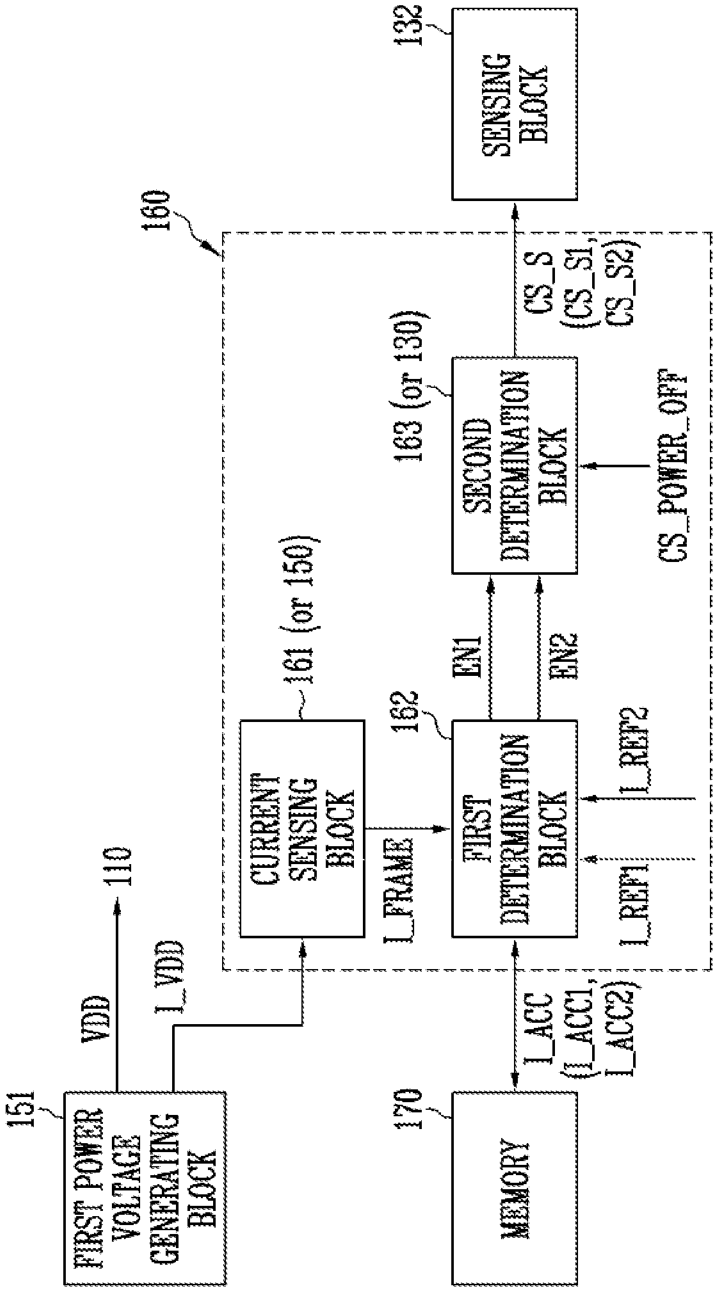
FIG. 4 illustrates an embodiment of a sensing controller.
Figure 5:
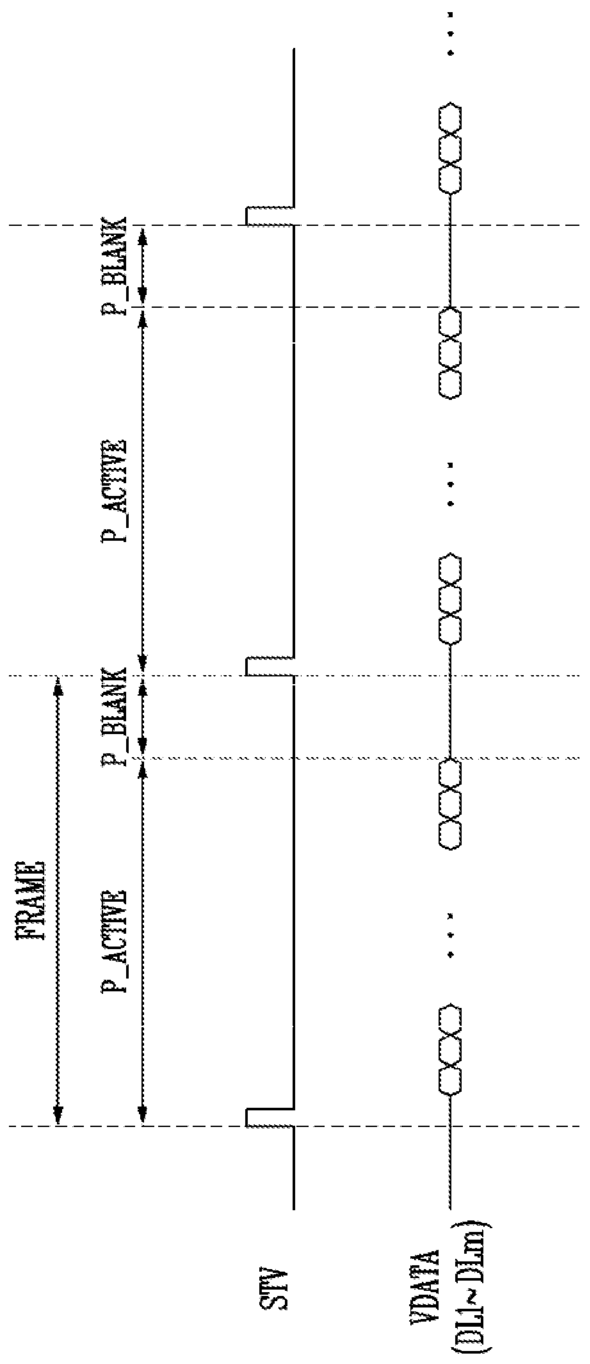
FIG. 5 illustrates an embodiment of a vertical blank section.
Figure 6A:
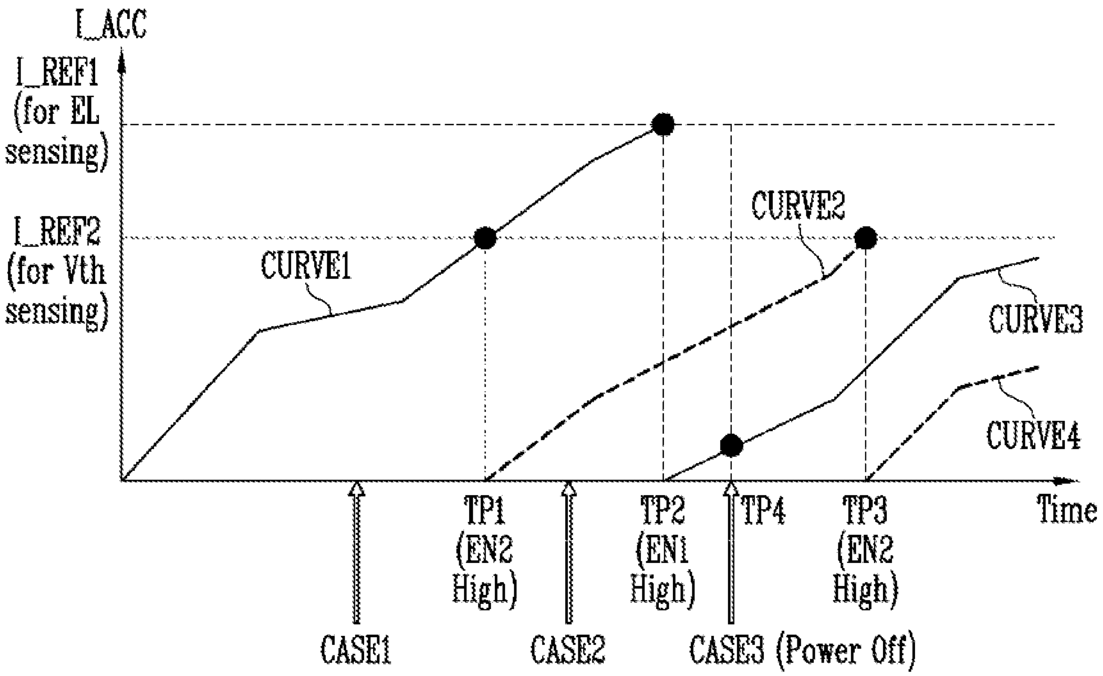
FIGS. 6A to 6C illustrate embodiments of the operation of a sensing controller.
Figure 6B:
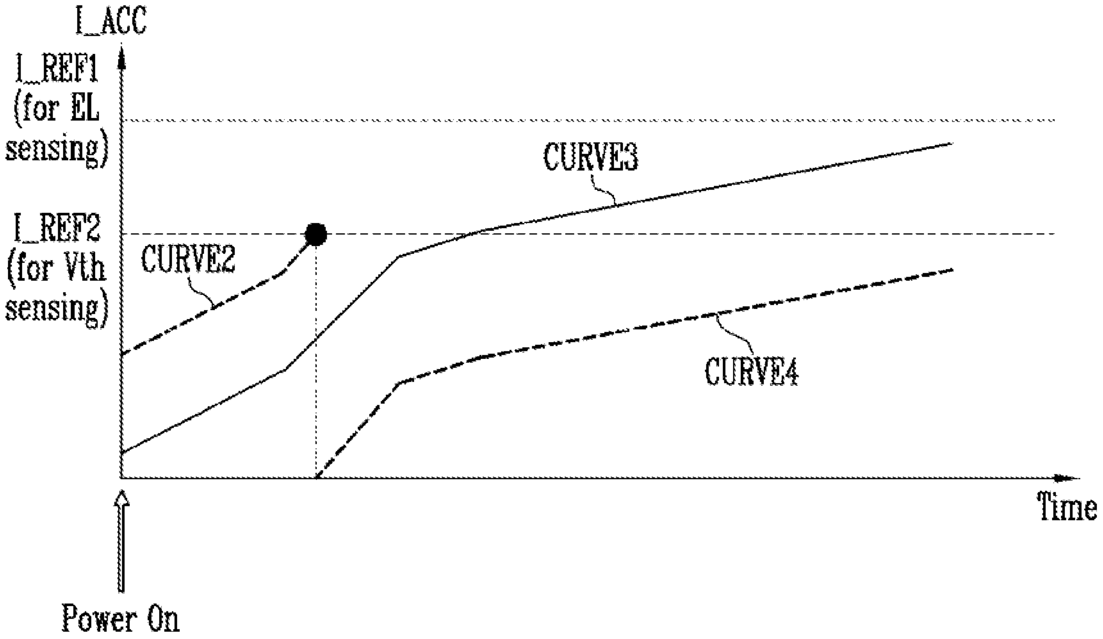
Figure 6C:
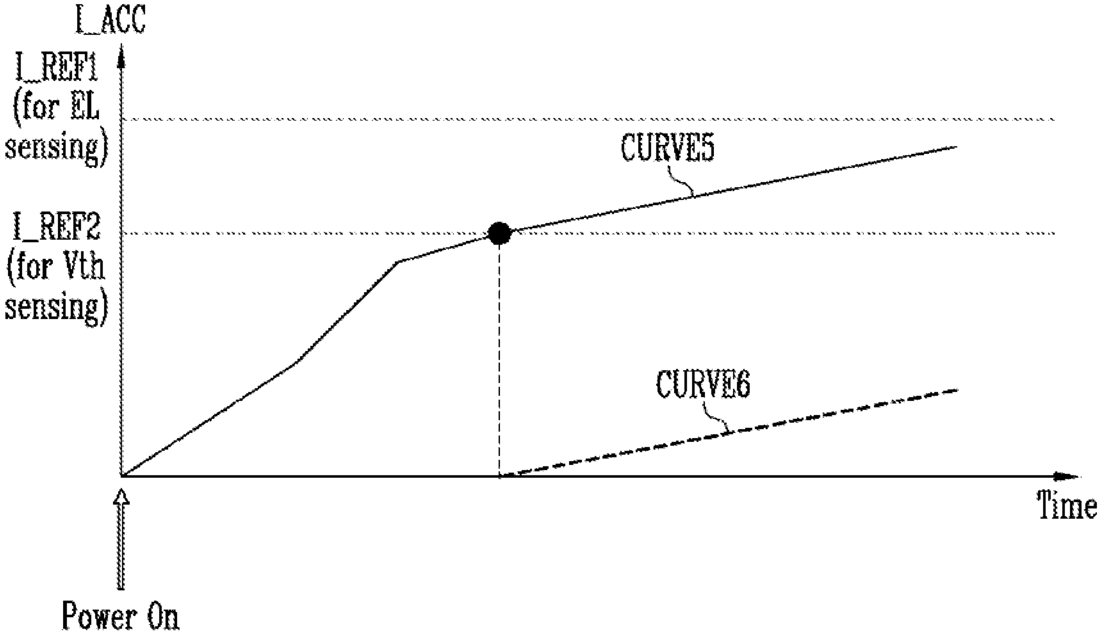

FIG. 4 is a diagram illustrating an embodiment of a sensing controller that may be included in the display device of FIG. 2. In FIG. 4, a first power voltage generating block (or generator) 151, a sensing block (or sensor) 132, and the memory 170 are further shown in relation to the operation of the sensing controller 160. FIG. 5 is a diagram for explaining a vertical blank section. FIGS. 6A to 6C are diagrams for embodiments of the operation of a first determination block (or first determiner or logic) that may be included in the sensing controller of FIG. 4.

Referring to FIGS. 2 to 4, the sensing controller 160 may include a current sensing block (or current sensor) 161, a first determination block (or first determiner or logic) 162, and a second determination block (or second determiner or logic) 163. Each of the current sensing block 161, the first determination block 162, and the second determination block 163 may be implemented as a combination of logic operation elements (or logic elements) or software in the timing controller 140. According to an embodiment, the current sensing block 161 may be included in the power supply 150 (e.g., refer to FIG. 2) and/or the second determination block 163 may be included in the data driver 130 (e.g., refer to FIG. 2). Hereinafter, according to an example order of the process for generating the sensing control signal CS_S, the first power voltage generating block 151, the current sensing block 161, the first determination block 162, the second determination block 163, and the sensing block 132 will be sequentially described.

The first power voltage generating block 151 may be included in the power supply 150 (e.g., described with reference to FIG. 2) to generate the first power voltage VDD. For example, the first power voltage generating block 151 may generate the first power voltage VDD suitable for driving the display unit 110 based on an external power. For example, the first power voltage generating block 151 may generate the first power voltage VDD having a constant voltage level. However, the present invention is not limited thereto. For example, the first power voltage VDD may change over time. The first power voltage VDD may be provided to the display unit 110. The first power voltage generating block 151 may be implemented as a power converter such as a boost converter.

In some embodiments, the first power voltage generating block 151 may measure the total current I_VDD using a current sensor at an output terminal from which the first power voltage VDD is output, and may output the total current I_VDD (or a measured signal corresponding to the total current I_VDD). An embodiment in which the first power voltage generating block 151 measures and outputs the total current I_VDD has been described, but the present invention is not limited thereto. For example, the current sensing block 161 may measure the total current I_VDD.

The current sensing block 161 may periodically sample or sense the total current I_VDD to generate a frame current value I_FRAME. For example, the current sensing block 161 may generate the frame current value I_FRAME by sampling or sensing the total current I_VDD in a blank section P_BLANK within one frame FRAME.

Referring to FIG. 5 to describe the blank section P_BLANK, a start signal STV may indicate the start of one frame FRAME, and may correspond to the start signal provided to the scan driver 120 (e.g., refer to FIG. 2) or the vertical synchronization signal provided to the driver 130 (e.g., refer to FIG. 2). Frames may be divided based on a time point at which the start signal STV has a second logic level (or logic high level).

One frame FRAME may include an active section P_ACTIVE and the blank section P_BLANK. The data signal VDATA applied to the data lines DL1 to DLm (e.g., refer to FIG. 2) in the active section P_ACTIVE may have a valid value. The data signal VDATA may be written to the pixel PXL (e.g., refer to FIGS. 2 and 3) (that is, all pixels or less than all pixels in the display unit 110) during the active section P_ACTIVE.

In the blank section P_BLANK, the data signal VDATA may not have the valid value or may have an invalid value. The data signal VDATA may not be written to the pixel PXL during the blank section P_BLANK, and the pixel PXL (that is, all or less than all pixels in the display unit 110) may be in a state of emitting light in response to the data signal VDATA written during the active section P_ACTIVE. For example, the total current I_VDD in the active section P_ACTIVE may reflect the state in which all or less than all pixels in the display unit 110 emit light in a corresponding frame FRAME. Thus, to consider the state in which all or less than all the pixels in the display unit 110 emit light in the corresponding frame FRAME (and the degree of deterioration accordingly), the current sensing block 161 may generate the frame current value I_FRAME by sampling or sensing the total current I_VDD in the blank section P_BLANK.

Referring back to FIG. 4, the first determination block 162 may generate or update the accumulated current value I_ACC by accumulating the frame current value I_FRAME. In an embodiment, the first determination block 162 may generate or update a first accumulated current value I_ACC1 by accumulating the frame current value I_FRAME. The first accumulated current value I_ACC1 may be used to determine whether to sense the characteristic of the light emitting element EL in the pixel PXL shown in FIG. 3.

Also, the first determination block 162 may generate or update a second accumulated current value I_ACC2 by accumulating the frame current value I_FRAME. The second accumulated current value I_ACC2 may be used to determine whether to sense the threshold voltage of the first transistor T1 in the pixel PXL shown in FIG. 3. As described with reference to FIGS. 1 and 2, to independently determine whether to sense the characteristic of the light emitting element EL and whether to sense the threshold voltage of the first transistor T1, the first determination block 162 may generate the first accumulated current value I_ACC1 and the second accumulated current value I_ACC2, respectively. The first and second accumulated current values I_ACC1 and I_ACC2 (that is, the accumulated current value I_ACC) may be stored in the memory 170.

Also, the first determination block 162 may generate or output the first enable signal EN1 based on the accumulated current value I_ACC and a first reference current value I_REF1. The first reference current value I_REF1 may be preset in consideration of a change in characteristic of the light emitting element EL in the pixel PXL according to the driving amount of the display unit 110 (e.g., refer to FIG. 2). For example, the first reference current value I_REF1 may be preset based on the change in the characteristic of the light emitting element EL according to a change in the accumulated current value I_ACC. For example, the first reference current value I_REF1 may be preset based on the amount of change in the accumulated current value I_ACC corresponding to the change in the characteristic of the light emitting element EL that causes the deterioration in image quality that can be visually recognized by a user. However, the first reference current value I_REF1 is not limited thereto. As will be described, for example, with reference to FIG. 7, the first reference current value I_REF1 may be changed. The first enable signal EN1 may indicate that the characteristic of the light emitting element EL in the pixel PXL should be sensed.

In an embodiment, the first determination block 162 may compare the first accumulated current value I_ACC1 and the first reference current value I_REF1, and may generate the first enable signal EN1 having a first value when the first accumulated current value I_ACC1 is greater than the first reference current value I_REF1. In addition, the first determination block 162 may initialize the first accumulated current value I_ACC1 in response to an output of the first enable signal EN1 having the first value or simultaneously with the output of the first enable signal EN1 having the first value.

Referring to FIG. 6A, as time (e.g., driving time of the display unit 110 shown in FIG. 2) elapses, the accumulated current value I_ACC may increase. When the display device 100 is first driven, the first accumulated current value I_ACC1 may change along a first curve CURVE1, and the first accumulated current value I_ACC1 may be equal to the first reference current value I_REF1 (e.g., the first reference current value I_REF1 for EL sensing) at a second time point TP2. In this case, at the second time point TP2, the first determination block 162 may generate or output the first enable signal EN1 having the first value (for example, a logic high level High), and may initialize the first accumulated current value I_ACC1. After the second time point TP2 (e.g., after the first accumulated current value I_ACC1 is initialized), the first accumulated current value I_ACC1 may change along a third curve CURVE3.

Referring back to FIG. 4, the first determination block 162 may generate or output the second enable signal EN2 based on the accumulated current value I_ACC and a second reference current value I_REF2. The second reference current value I_REF2 may be preset in consideration of a change in the characteristic of the first transistor T1 in the pixel PXL according to the driving amount of the display unit 110 (e.g., refer to FIG. 2), and the second reference current value I_REF2 may be different from the first reference current value I_REF1. For example, the second reference current value I_REF2 may be preset based on the change in the threshold voltage of the first transistor T1 according to the change in the accumulated current value I_ACC. For example, the second reference current value I_REF2 may be preset based on the amount of change in the accumulated current value I_ACC corresponding to the change in the threshold voltage of the first transistor T1 that causes the deterioration in image quality that can be visually recognized by the user. However, the second reference current value I_REF2 is not limited thereto. As will be described with reference to FIG. 7, the second reference current value I_REF2 may be changed. The second enable signal EN2 may indicate that the threshold voltage of the first transistor T1 in the pixel PXL should be sensed.

In an embodiment, the first determination block 162 may compare the second accumulated current value I_ACC2 and the second reference current value I_REF2, and may generate the second enable signal EN2 having the first value when the second accumulated current value I_ACC2 is greater than the second reference current value I_REF2. In addition, the first determination block 162 may initialize the second accumulated current value I_ACC2 in response to an output of the second enable signal EN2 having the first value or simultaneously with the output of the second enable signal EN2 having the first value.

Referring to FIG. 6A, when the display device 100 is first driven, the second accumulated current value I_ACC2 may change along the first curve CURVE1 and the second accumulated current value I_ACC2 may be equal to the second reference current value I_REF2 (that is, the second reference current value I_REF2 for Vth sensing) at a first time point TP1. In this case, at the first time point TP1, the first determination block 162 may generate or output the second enable signal EN2 having the first value (for example, the logic high level High) and may initialize the second accumulated current value I_ACC2. After the first time point TP1 (e.g., after the second accumulated current value I_ACC2 is initialized), the second accumulated current value I_ACC2 may change along a second curve CURVE2.

Also, similar to the first time point TP1, the second accumulated current value I_ACC2 may be equal to the second reference current value I_REF2 at a third time point TP3. In this case, at the third time point TP3, the first determination block 162 may generate or output the second enable signal EN2 having the first value (for example, the logic high level High) and may initialize the second accumulated current value I_ACC2. After the third time point TP3, the second accumulated current value I_ACC2 may change along a fourth curve CURVE4.

In FIG. 6A, an embodiment in which the first reference current value I_REF1 is larger than the second reference current value I_REF2 is shown, but the present invention is not limited thereto. For example, the first reference current value I_REF1 may be smaller than the second reference current value I_REF2.

Referring back to FIG. 4, the second determination block 163 may generate or output the sensing control signal CS_S based on the first and second enable signals EN1 and EN2 and a power control signal CS_POWER_OFF. The power control signal CS_POWER_OFF may be a signal instructing the power-off of the display device 100 and, for example, may be provided from the external device. When the sensing section is allocated immediately before the display device 100 is powered off, the power control signal CS_POWER_OFF may indicate the start of the sensing section. When the sensing section is allocated to a time other than immediately before the display device 100 powered off, a signal corresponding to the time (that is, the sensing section) may be provided to the second determination block 163 instead of the power control signal CS_POWER_OFF.

The second determination block 163 may output first and second sensing control signals CS_S1 and CS_S2 respectively corresponding to the first and second enable signals EN1 and EN2 in response to the power control signal CS_POWER_OFF. For example, the second determination block 163 may output the first enable signal EN1 (or a value of the first enable signal EN1) as the first sensing control signal CS_S1 in response to the power control signal CS_POWER_OFF, and may output the second enable signal EN2 (or a value of the second enable signal EN2) as the second sensing control signal CS_S2 in response to the power control signal CS_POWER_OFF.

The sensing block 132 may sense the characteristic of the light emitting element EL in the pixel PXL in response to the first sensing control signal CS_S1 having the first value (that is, the first enable signal EN1 having the first value). For example, the sensing block 132 may sense the characteristic of the light emitting element EL of each of the pixels in the display unit 110. Similarly, the sensing block 132 may sense the threshold voltage of the first transistor T1 in the pixel PXL in response to the second sensing control signal CS_S2 having the first value (that is, the second enable signal EN2 having the first value). For example, the sensing block 132 may sense the threshold voltage of the first transistor T1 of each of the pixels in the display unit 110. The sensing block 132 may be included in the data driver 130 and, for example, may correspond to a part of the data driver 130 that performs a sensing function among data signal generating function and sensing function of the data driver 130.

Referring to FIG. 6A, for example, when the power control signal CS_POWER_OFF is provided to the display device 100 in a section prior to the first time point TP1 (CASE1), the sensing block 132 may not perform sensing of the light emitting element EL and sensing of the first transistor T1. This is because both the first and second enable signals EN1 and EN2 do not have the first value (for example, the first and second enable signals EN1 and EN2 have a second value or a logic low level). In one embodiment, when the power control signal CS_POWER_OFF is provided to the display device 100 in a section between the first time point TP1 and the second time point TP2 (CASE2), the sensing block 132 may perform only the sensing of the first transistor T. This is because only the second enable signal EN2 has the first value. In one embodiment, when the power control signal CS_POWER_OFF is provided to the display device 100 at a fourth time point TP4 (in addition, when the power control signal CS_POWER_OFF has not been provided to the display device 100 before the fourth time point TP) (CASE3), the sensing block 132 may perform sensing of the light emitting element EL and sensing of the first transistor T1, respectively. This is because the first and second enable signals EN1 and EN2 have the first value.

After the sensing control signal CS_S is output, values of the first and second enable signals EN1 and EN2 may be initialized (for example, may be initialized to the second value or the logic low level).

In an embodiment, when the display device 100 is powered on, the first determination block 162 may load the first and second accumulated current values I_ACC1 and I_ACC2 (that is, the accumulated current value I_ACC) from the memory 170, and may update the first and second accumulated current values I_ACC1 and I_ACC2 by accumulating the frame current value I_FRAME.

Referring to FIGS. 6A and 6B, for example, it is assumed that the display device 100 is powered off at the fourth time point TP4. Thereafter, when the display device 100 is powered on, the first determination block 162 may load the first and second accumulated current values I_ACC1 and I_ACC2 from the memory 170, respectively, and may update the first and second accumulated current values I_ACC1 and I_ACC2 by accumulating the frame current value I_FRAME. As shown in FIG. 6B, in the way as before the display device 100 is powered off, the first accumulated current value I_ACC1 may change along the third curve CURVE3, and the second accumulated current value I_ACC2 may change along the second curve CURVE2 (and the fourth curve CURVE4).

In one embodiment, when the display device 100 is powered on, the first determination block 162 may initialize or reset the first and second accumulated current values I_ACC1 and I_ACC2.

Referring to FIGS. 6A and 6C, for example, it is assumed that the display device 100 is powered off at the fourth time point TP4. Thereafter, when the display device 100 is powered on, the first determination block 162 may initialize the first and second accumulated current values I_ACC1 and I_ACC2, and may update the first and second accumulated current values I_ACC1 and I_ACC2 by accumulating the frame current value I_FRAME. As shown in FIG. 6C, unlike before the display device 100 is powered off, the first accumulated current value I_ACC1 may change along a fifth curve CURVE5, and the second accumulated current value I_ACC2 may change along the fifth curve CURVE5 (and a sixth curve CURVE6).

When the display device 100 is powered on, in FIG. 6B, an embodiment in which the first and second accumulated current values I_ACC1 and I_ACC2 are loaded from the memory 170 has been described. In FIG. 6C, an embodiment in which the first and second accumulated current values I_ACC1 and I_ACC2 are initialized has been described. However, the present invention is not limited thereto. For example, when the display device 100 is powered on, the first determination block 162 may load the first accumulated current value I_ACC1 and may initialize the second accumulated current value I_ACC2.

As described above, the sensing controller 160 may accumulate the total current I_VDD applied to the display unit 110 to generate the first and second accumulated current values I_ACC1 and I_ACC2, respectively, and may determine whether to sense the characteristic of the light emitting element EL and whether to sense the threshold voltage of the first transistor T1 based on the first and second accumulated current values I_ACC1 and I_ACC2. Accordingly, unnecessary sensing can be prevented, and the number of sensing times and one sensing time can be reduced.

Figure 7:
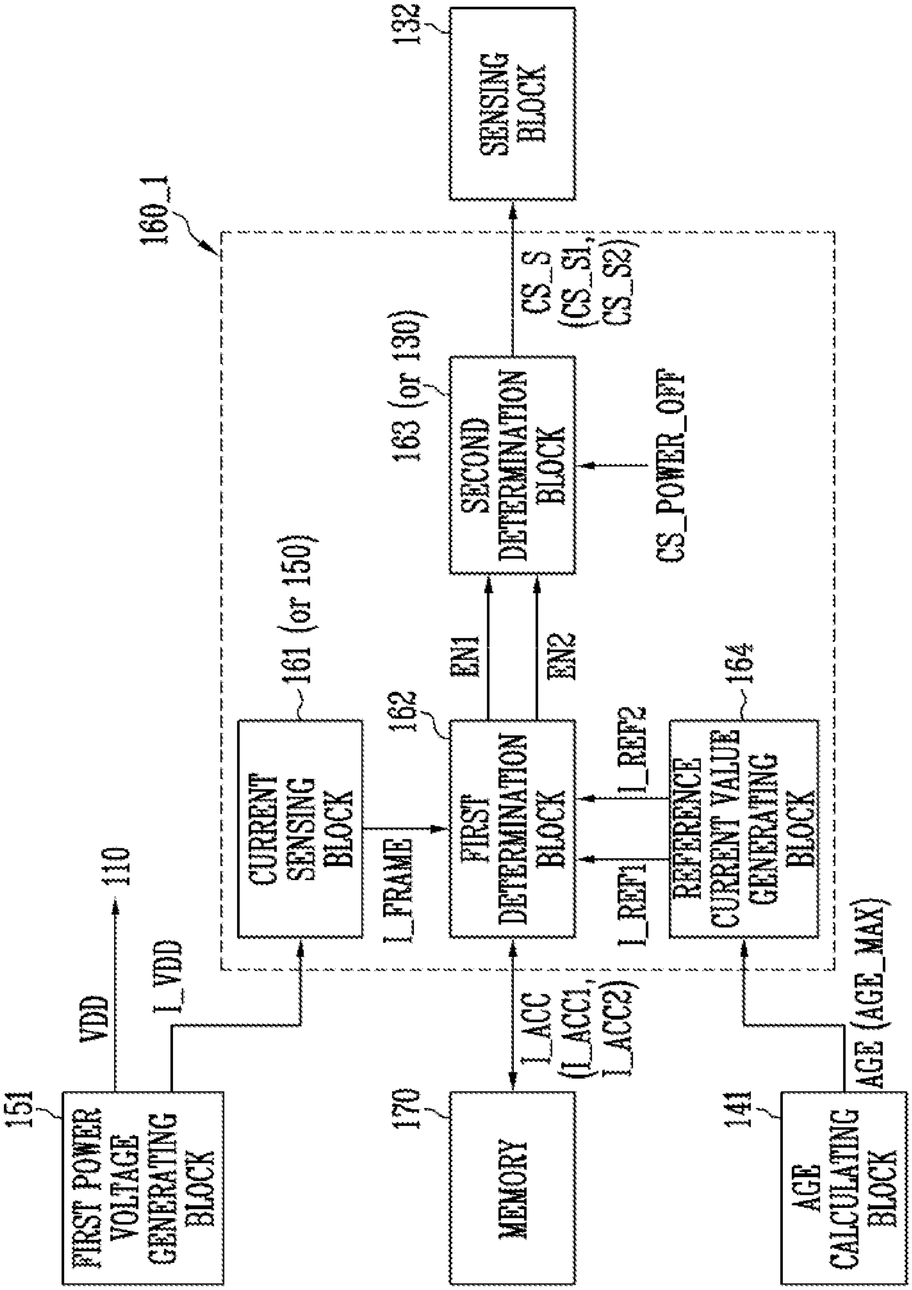
FIG. 7 illustrates an embodiment of a sensing controller.
Figure 8:
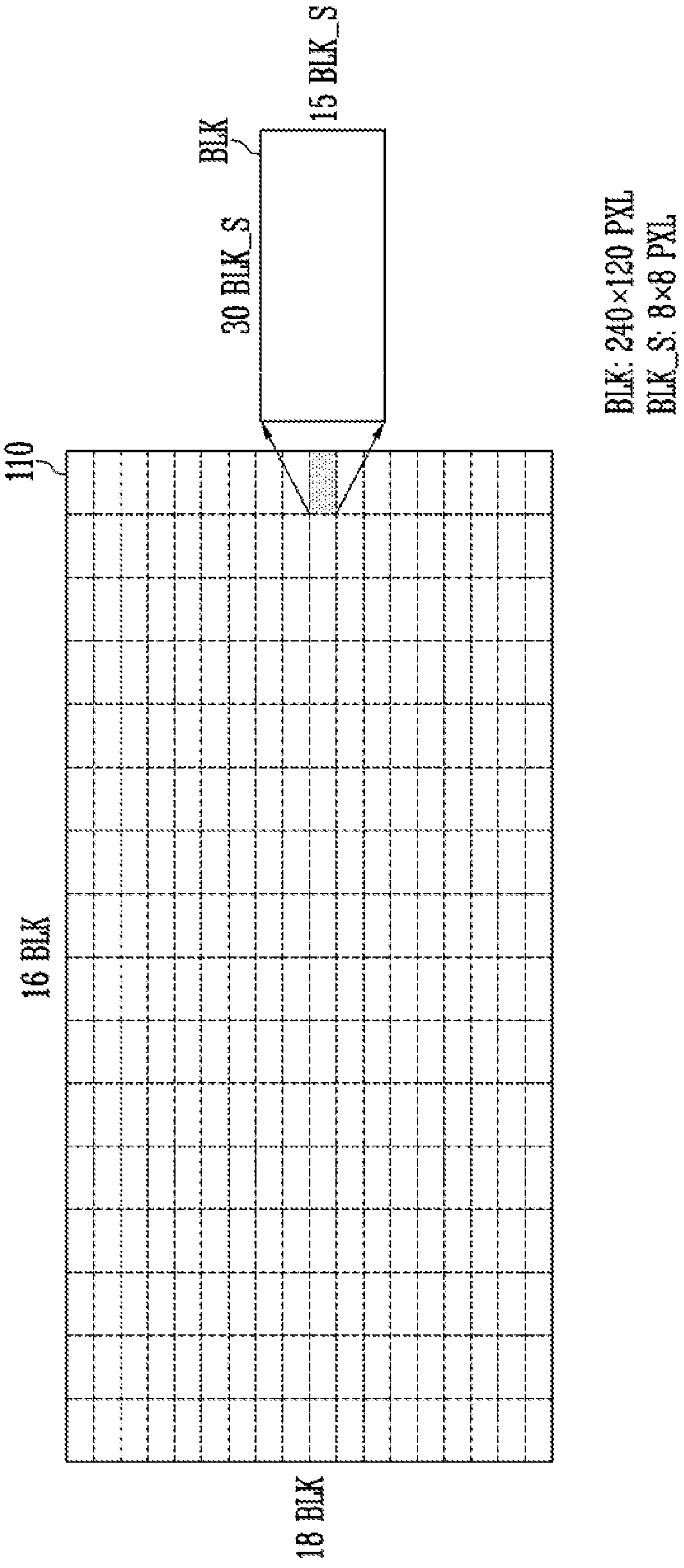
FIG. 8 illustrates an embodiment of an age calculating operation.
Figure 9A:
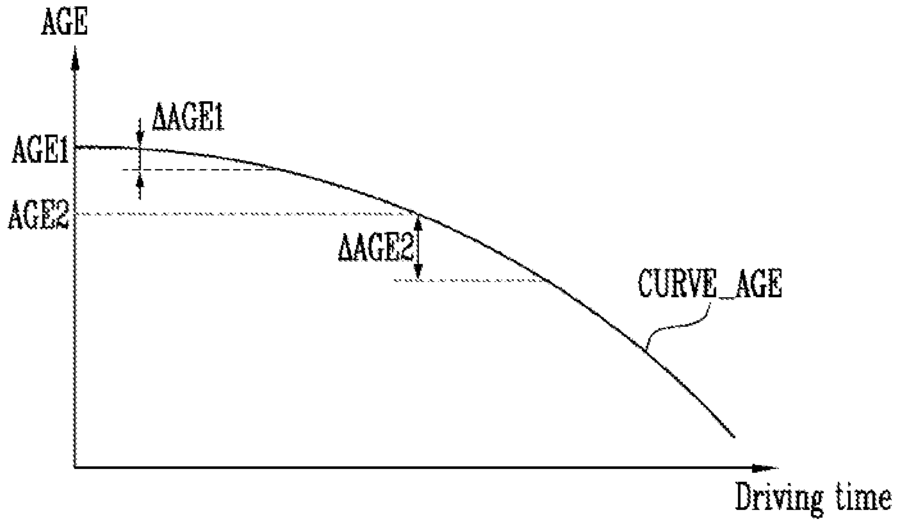
FIG. 9A illustrates an example relationship between pixel age and driving time.
Figure 9B:
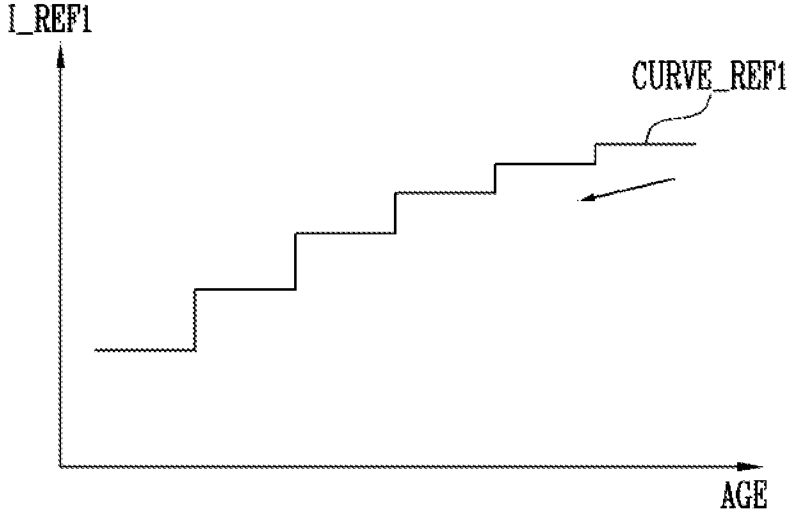
FIG. 9B illustrates an example relationship between a first reference current value and pixel age.
Figure 9C:
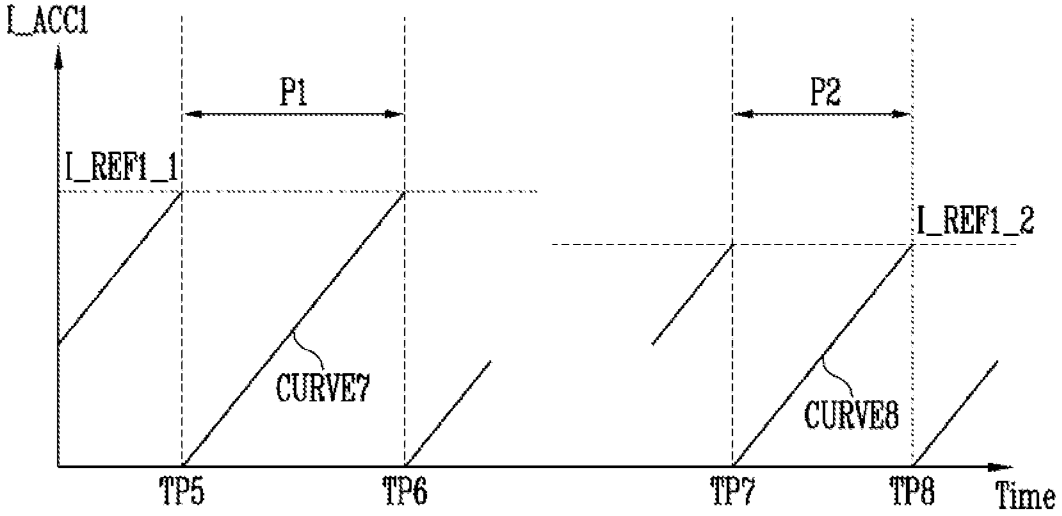
FIG. 9C illustrates an example of changes in a sensing cycle and changes in the first reference current value.
Figure 10A:
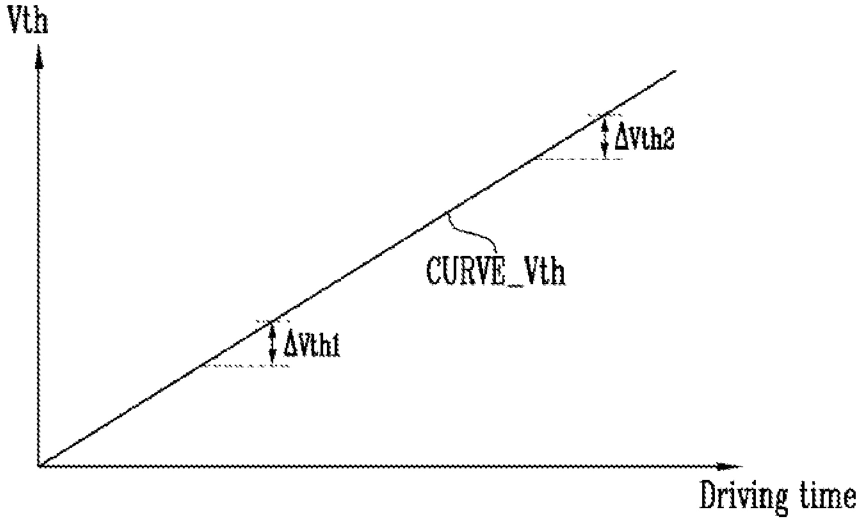
FIG. 10A illustrates an example relationship between a change in threshold voltage of a driving transistor and pixel driving time.
Figure 10B:
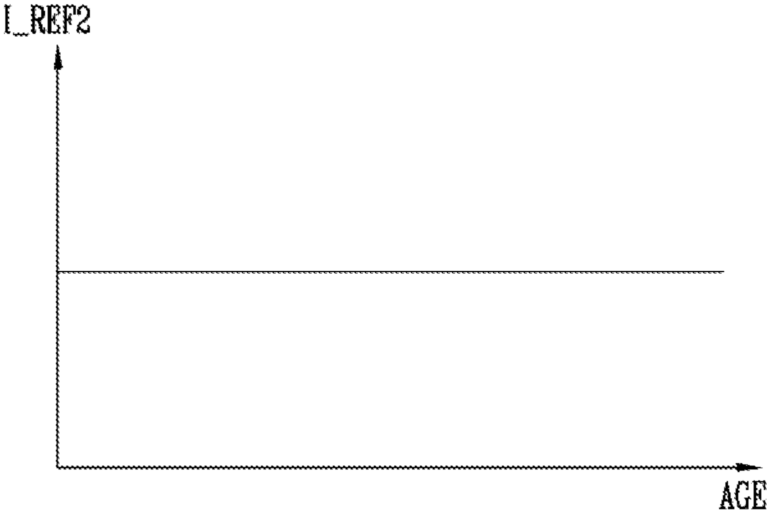
FIG. 10B illustrates a example relationship between a second reference current value and pixel age.

FIG. 7 is a diagram illustrating an embodiment of the sensing controller that may be included in the display device of FIG. 2. In FIG. 7, an age calculating block (or age calculator) 141 is further shown in relation to setting of the first and second reference current values I_REF1 and I_REF2 in the sensing controller 160. FIG. 8 is a diagram for explaining an embodiment of the operation of an age calculating block shown in FIG. 4. FIG. 8 shows an embodiment of the display unit 110 included in the display device 100 of FIG. 2. FIG. 9A is a diagram illustrating an example relationship between pixel age and pixel driving time. FIG. 9B is a diagram illustrating an example relationship between first reference current values and pixel age. FIG. 9C is a diagram for explaining an example of changes in a sensing cycle relative to changes in first reference current values. FIG. 9C is a diagram corresponding to FIG. 6A. FIG. 10A is a diagram illustrating an example of a change in a threshold voltage of a driving transistor verses pixel driving time. FIG. 10B is a diagram illustrating an example relationship between a second reference current value and pixel age.

Referring to FIGS. 2 to 4 and 7 to 10B, a sensing controller 160_1 may further include a reference current value generating block 164. Except for the reference current value generating block 164, the sensing controller 160_1 may be substantially the same as or similar to the sensing controller 160 of FIG. 4. Therefore, duplicate descriptions will be omitted.

The age calculating block 141 may be included in the timing controller 140 described with reference to FIG. 2, and may calculate the age AGE of the pixel PXL (or the light emitting element EL in the pixel PXL). As described with reference to FIG. 2, the age calculating block 141 may periodically scale and accumulate the grayscale value corresponding to the pixel PXL in the image data DATA2 (input image data DATA1 or frame data) to generate or update the accumulated grayscale value (e.g., accumulated data, stress data, or deteriorated data). The age calculating block 141 may then calculate the age AGE of the pixel PXL based on the accumulated grayscale value. Also, the age calculating block 141 may update the accumulated grayscale value by reflecting conditions that affect driving amount (e.g., amount of light emitted or deterioration) of the pixel PXL. Examples of conditions that affect driving amount include, but are not limited to, a temperature of the display device 100 (or display unit 110), a position of the pixel PXL, a driving frequency of the display device 100 (for example, a refresh rate of the image displayed on the display unit 110), an emission duty of the pixel PXL (for example, a ratio of the time the pixel PXL emits light within one frame), a current limiting weight (e.g., a ratio of limiting the current flowing through the display unit 110 to reduce power consumption of the display device 100, or a ratio of scaling the grayscale value corresponding thereto), to the grayscale value. In this way, age calculating block 141 may generate or update age data for all or less than all pixels in the display unit 110. As described with reference to FIG. 2, information indicative of the age AGE (or age data) may be stored in memory 170.

In an embodiment, the age calculating block 141 may divide the display unit 110 into blocks BLK, each including a plurality of pixels PXL, and may calculate the age AGE for each block BLK. Since adjacent pixels have similar characteristics (for example, characteristics due to process deviation in a manufacturing process), and also may emit light with the same or similar luminance during driving, the degree of deterioration of the adjacent pixels or the age AGE corresponding thereto may be the same or similar to each other. Accordingly, the age calculating block 141 may reduce the load in calculating the age AGE by calculating the age AGE for each block BLK.

Referring to FIG. 8, for example, when the display unit 110 has a UHD resolution (e.g., 3840×2160 pixels PXL), the display unit 110 may be divided into 16×18 blocks BLK each including 256×120 pixels PXL. In this case, the age calculating block 141 may calculate the age AGE for each block BLK. For example, an average grayscale value may be calculated by performing an average operation of grayscale values corresponding to the pixels PXL in one block BLK. The age AGE may then be calculated by scaling and accumulating the average grayscale value. In one embodiment, each block BLK may be divided into 30×15 sub-blocks BLK_S each including 8×8 pixels PXL, and the age calculating block 141 may calculate the age AGE for each sub-block BLK_S. The block BLK and the sub-block BLK_S shown in FIG. 8 are examples, and the number of pixels PXL in the block BLK and the sub-block BLK_S may be variously changed.

The reference current value generating block 164 may change at least one of the first or second reference current values I_REF1 and I_REF2 based on the age AGE of the pixel PXL. In an embodiment, the reference current value generating block 164 may change at least one of the first or second reference current values I_REF1 and I_REF2 based on a maximum age AGE_MAX (e.g., maximum accumulated grayscale value or maximum stress value). The maximum age AGE_MAX may have, for example, the largest value among ages AGE in the age data, and may correspond to the most deteriorated pixel PXL (block BLK or sub-block BLK_S) among the pixels in the display unit 110.

Referring to FIG. 9A, the age AGE of the pixel PXL may change along an age curve CURVE_AGE. As the driving time increases, the rate of change in the age AGE of the pixel PXL (e.g., the slope of the age curve CURVE_AGE) may also increase. For example, based on a specific driving time, the change in a second age ΔAGE2 corresponding to a second age value AGE2 may be greater than a change in a first age ΔAGE1 corresponding to a first age value AGE1. Thus, as the pixel PXL deteriorates, deterioration of the pixel PXL may be accelerated, and the number of sensing times of the characteristic of the light emitting element EL of the pixel PXL may be increased. Accordingly, as the age AGE of the pixel PXL increases, the first reference current value I_REF1 may decrease.

Referring to FIG. 9B, the first reference current value I_REF1 may change along a first reference curve CURVE_REF1. As the age AGE increases, the first reference current value I_REF1 may gradually decrease. For example, the reference current value generating block 164 may gradually decrease the first reference current value I_REF1. However, the present invention is not limited thereto. For example, the first reference current value I_REF1 may be continuously decreased to correspond to the age curve CURVE_AGE of FIG. 9A.

Referring to FIG. 9C, as time (e.g., driving time of the display unit 110 shown in FIG. 2) elapses, the pixel PXL may deteriorate or the age AGE of the pixel PXL may increase. In this case, according to the first reference curve CURVE_REF1 of FIG. 9B, the first reference current value I_REF1_2 in a second section P2 may be set to be smaller than the first reference current value I_REF1_1 in a first section P1.

For example, when the display unit 110 continuously displays a specific image such as a full-white pattern, the first accumulated current value I_ACC1 may change along a seventh curve CURVE7, an eighth curve CURVE8, and the like, having substantially the same slope. It may be assumed that sensing is performed at a time point substantially the same as a time point at which the first accumulated current value I_ACC1 becomes equal to first reference current values I_REF1_1 and I_REF1_2 in a corresponding section. In this case, sensing may be performed at a fifth time point TP5, a sixth time point TP6, a seventh time point TP7, and an eighth time point TP8, and the width of the second section P2 may be reduced compared to the first section P1 by a ratio between the first reference current value I_REF1_2 in the second section P2 and the first reference current value I_REF1_1 in the first section P1. For example, the sensing cycle in the second section P2 (e.g., cycle for sensing the characteristic of the light emitting element EL) may be reduced more than the sensing cycle in the first section P1. Therefore, before a change in luminance due to deterioration of the pixel PXL is visually recognized by the user, the characteristic of the light emitting element EL may be sensed, and deterioration of a corresponding pixel PXL may be compensated based on the sensed characteristic. For example, distortion of image quality due to the deterioration of the pixel PXL can be reduced or prevented in advance.

Referring to FIG. 10A, a threshold voltage Vth of the first transistor T1 (e.g., refer to FIG. 3) may change along a threshold voltage curve CURVE_Vth. As driving time increases, the rate of change in the threshold voltage Vth of the first transistor T1 may be constant. For example, the amount of change ΔVth1 in a first threshold voltage and the amount of change ΔVth2 in a second threshold voltage corresponding to different driving times may be the same. In this case, as shown in FIG. 10B, even if the age AGE of the pixel PXL increases, the second reference current value I_REF2 may be set to be constant.

As described above, the sensing controller 160_1 may change at least one of the first or second reference current values I_REF1 and I_REF2, which is the reference for determining whether to sense or not, based on the age AGE (e.g., age data, stress data, or deterioration data) of the pixel PXL. Accordingly, as the pixel PXL deteriorates, the sensing cycle can be shortened and distortion of image quality due to the deterioration of the pixel PXL can be reduced or prevented in advance.

In accordance with one or more of the aforementioned embodiments, a display device may determine whether sensing of a pixel (e.g., sensing of a characteristic of a light emitting element and/or sensing of a threshold voltage of driving transistor) is to be performed. This determination may be made based on the degree of deterioration of the pixel, as indicated by the total current (or accumulated current value) applied to the display unit. Accordingly, unnecessary pixel sensing can be reduced or prevented and the number of sensing times can be reduced.

In addition, the display device may individually determine whether to sense the characteristic of the light emitting element and whether to sense the threshold voltage of the driving transistor. The display device may then independently perform sensing of the characteristic of the light emitting element and sensing of the threshold voltage of the driving transistor at one or more time points. Accordingly, overall sensing time can be reduced, and the sensing can be performed more accurately at each of the time points at which sensing of the light emitting element and/or the driving transistor is performed.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, blocks, logic, interfaces, drivers, generators and other signal generating and signal processing features of the embodiments disclosed herein may be implemented, for example, in non-transitory logic that may include hardware, software, or both. When implemented at least partially in hardware, the controllers, processors, devices, modules, units, blocks, logic, interfaces, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, blocks, logic, interfaces, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Furthermore, the display device may change the reference current value (e.g., a reference for determining whether to sense or not) based on the age (e.g., age data, stress data, or deterioration data) of the pixel. Accordingly, as the pixel deteriorates, the sensing cycle can be shortened, and distortion of image quality due to the deterioration of the pixel can be reduced or prevented in advance. The effects according to the embodiments are not limited by the contents described above, and more various effects are included in the disclosure.

Although the technical spirit of the disclosure has been described in detail through the above-described embodiments, it should be noted that the above-described embodiments are for illustrative purpose only and are not intended to limit the disclosure. In addition, those skilled in the art may understand that various modifications are possible within the scope of the technical spirit of the disclosure. The scope of the disclosure is not limited by the detailed descriptions of the present specification, and should be defined by the accompanying claims. Furthermore, changes or modifications of the disclosure derived from the meanings and scope of the claims, and equivalents thereof should be construed as being included in the scope of the disclosure. The embodiments may be combined to form additional embodiments.

What is claimed is:

1. A display device, comprising:

a display panel including pixels connected between a first power line and a second power line, each of the pixels including a light emitting element configured to emit light in response to a driving current flowing between the first and second power lines;

a power supply configured to apply power voltages to the first and second power lines of the display panel;

a current measurer configured to measure a current applied to the display panel from the power supply through the first and second power lines;

a sensing controller configured to output a first sensing control signal indicating whether to sense a voltage-current characteristic of the light emitting element of at least one of the pixels based on a measured current; and a sensor configured to sense the voltage-current characteristic of the light emitting element of the at least one pixel in response to the first sensing control signal, wherein the sensing controller is configured to periodically accumulate a value of the measured current to generate a first accumulated current and the first sensing control signal in response to the first accumulated current value being greater than or equal to a first reference current value.

2. The display device of claim 1, wherein:

when a power control signal instructing that the display device is to be powered off is provided to the display device, the sensor is configured to sense the voltage-current characteristic of the light emitting element in response to the first sensing control signal having a first value.

3. The display device of claim 1, wherein:

when the first sensing control signal has a second value, the sensor does not sense the voltage-current characteristic of the light emitting element.

4. The display device of claim 1, wherein the sensing controller is configured to:

compare the first accumulated current value and the first reference current value, and output the first sensing control signal having a first value when the first accumulated current value is greater than the first reference current value.

5. The display device of claim 4, wherein the sensing controller is configured to initialize the first accumulated current value when the first sensing control signal is an output having the first value.

6. The display device of claim 5, further comprising:

a storage area configured to store the first accumulated current value, wherein the sensing controller is configured to load the first accumulated current value stored in the storage area when the display panel is powered on.

7. The display device of claim 5, wherein the sensing controller is configured to initialize the first accumulated current value when the display panel is powered off or powered on.

8. The display device of claim 4, further comprising:

an age calculator configured to calculate ages of the pixels based on grayscale values of the pixels, wherein the sensing controller is configured to change the first reference current value based on the ages, and wherein the grayscale values are included in image data corresponding to an image displayed on the display panel.

9. The display device of claim 8, wherein:

the sensing controller is configured to change the first reference current value based on a predetermined age having a largest value among the ages, and the predetermined age corresponds to a pixel that has a predetermined degree of deterioration among the pixels.

10. The display device of claim 9, wherein the sensing controller is configured to gradually decrease the first reference current value as the predetermined age increases.

11. The display device of claim 9, wherein a cycle of sensing the voltage-current characteristic of the light emitting element by the sensor decreases as the first reference current value decreases.

12. The display device of claim 1, wherein each of the pixels includes:

a driving transistor configured to control an amount of the driving current flowing through the light emitting element; and a sensing transistor connected between a readout line and a node to which one electrode of the driving transistor and one electrode of the light emitting element are connected.

13. The display device of claim 12, wherein the sensor is configured to:

apply a reference voltage to the one electrode of the light emitting element through the readout line and the sensing transistor, and sense a current flowing through the readout line and the light emitting element as the voltage-current characteristic of the light emitting element in response to the reference voltage.

14. The display device of claim 12, wherein:

the sensing controller is configured to output a second sensing control signal indicating whether to sense a threshold voltage of the driving transistor based on the measured current, and the sensor is configured to sense the threshold voltage of the driving transistor in response to the second sensing control signal.

15. The display device of claim 14, wherein the sensing controller is configured to:

compare a second accumulated current value and a second reference current value, output the second sensing control signal having a first value when the second accumulated current value is greater than the second reference current value, and initialize the second accumulated current value when the second sensing control signal having the first value is output.

16. A display device, comprising:

a display panel including a pixel connected between a first power line and a second power line, the pixel including a light emitting element connected between the first and second power lines and a driving transistor configured to control a driving current flowing through the light emitting element;

a power supply configured to apply power voltages to the first and second power lines of the display panel;

a current measurer configured to measure a current applied to the display panel from the power supply through the first and second power lines;

a sensing controller configured to output a first sensing control signal indicating whether to sense a threshold voltage of the driving transistor based on a measured current; and a sensor configured to sense the threshold voltage of the driving transistor in response to the first sensing control signal, wherein the sensing controller is configured to periodically: accumulate a value, of the measured current to generate a first accumulated current value and output the first sensing control signal in response to the first accumulated current value being greater than or equal to a first reference current value.

17. A display device, comprising:

a display panel including a pixel connected between a first power line and a second power line, the pixel including a light emitting element connected between the first and second power lines and a driving transistor configured to control a driving current flowing through the light emitting element in response to a data signal;

a data driver configured to generate the data signal based on image data, provide the data signal to the pixel, and receive a sensing signal corresponding to characteristic information of the light emitting element;

a current measurer configured to measure a current applied to the display panel from a power supply through the first and second power lines;

an age calculator configured to calculate an age of the pixel based on the image data; and a sensing controller configured to adjust a time cycle of sensing a characteristic of the light emitting element by the data driver based on the age, Wherein the sensing controller is configured to output a first sensing control signal in response to a first accumulated current value, in which a value of the measured current is greater than or equal to a first reference current value.

18. The display device of claim 17, wherein:

the power supply configured to apply power voltages to the first and second power lines of the display panel; and the current measurer configured to measure the current applied to the display panel from the power supply through the first and second power lines, wherein the sensing controller is configured to:

accumulate a value of a measured current to update the first accumulated current value, compare the first accumulated current value and the first reference current value, determine whether to sense the characteristic of the light emitting element when the first accumulated current value is greater than the first reference current value, and change the first reference current value based on the age.

19. The display device of claim 18, wherein:

the sensing controller is configured to gradually decrease the first reference current value as the age increases, and the time cycle of sensing the characteristic of the light emitting element by the data driver decreases as the first reference current value decreases.

* * * * *